Sept. 13, 1955      H. WOEHLER      2,717,503
ICE MAKER
Filed March 4, 1953
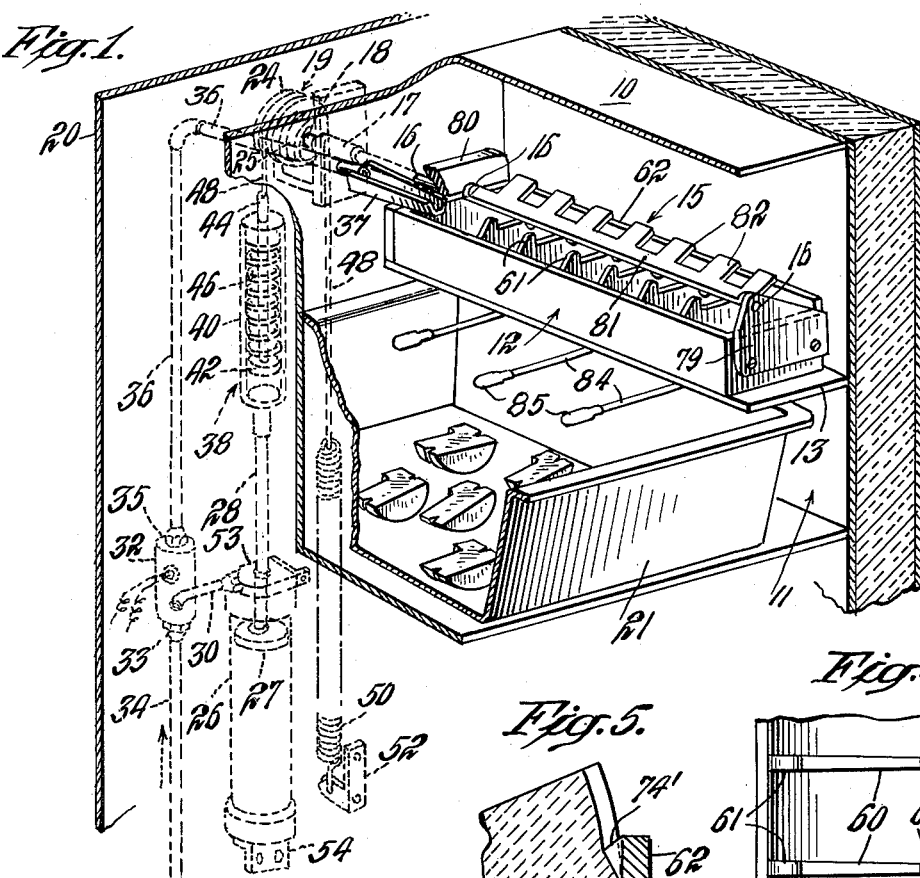
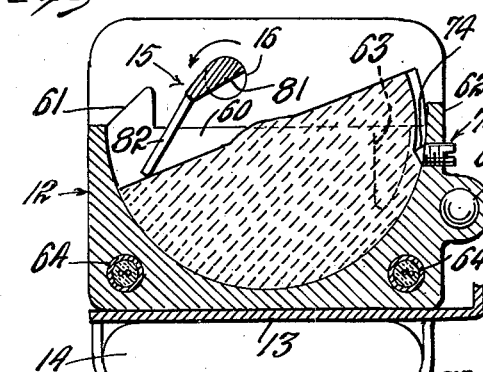
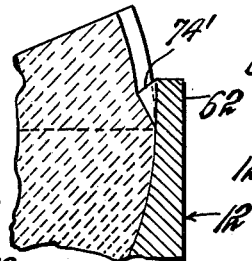
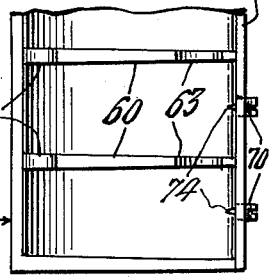
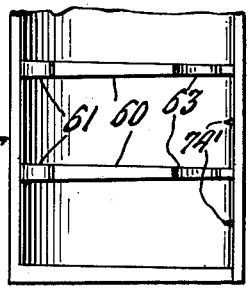
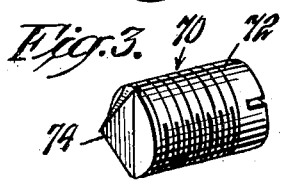
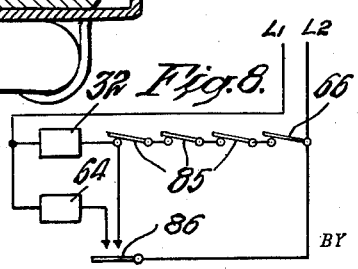
INVENTOR.
HAROLD WOEHLER
BY *J. H. Kelly*
ATTORNEY United States Patent Office 2,717,503
Patented Sept. 13, 1955

2,717,503

ICE MAKER

Harold Woehler, Evansville, Ind., assignor to Servel, Inc., New York, N. Y., a corporation of Delaware Application March 4, 1953, Serial No. 340,192

7 Claims. (Cl. 62—7)

This invention relates to automatic making, harvesting, drying, and storing of ice pieces, generally called ice cubes.

This invention may be considered an addition and improvement to the ice maker disclosed and claimed in the copending patent application of Sven W. E. Andersson, Serial No. 205,519, filed January 11, 1951.

Briefly, the above copending Andersson application discloses an ice maker wherein an ice forming mold has a generally arcuate contour so that a piece of ice may be readily turned or swept from the mold by relative turning movement between the mold and the ice piece. The ice removing action is automatic, as is the filling of the mold, freezing, and loosening of the ice piece. The ice piece is detained for thorough drying before discharge to storage. The automatic operation is stopped short of discharge of ice to storage, and remains suspended during the time that a desired quantity of ice pieces is held in storage. In the specific structure disclosed in the above Andersson application, power for operating the ice release and the control mechanisms is provided by a hydraulic motor which also measures and delivers a quantity of water to the ice mold for freezing. The hydraulic motor is connected to the ice release mechanism by a force limiter which acts also as a dashpot. The arrangement is such that the hydraulic motor may complete a power stroke even though the release mechanism be stalled by contact with the ice still frozen to the mold. The release mechanism continues to apply force to the ice and when the ice has been thawed free of the mold, the force limiter operates the release mechanism which ejects the ice from the mold. The disclosure of the above Andersson application may be considered a part of this instant application and may be referred to for a detailed description of parts thereof that are common to the two patent applications.

In ice makers of the type disclosed in the above Andersson patent application wherein a force is applied simultaneously to a plurality of ice pieces that are frozen tightly in a mold, while such ice pieces are being thawed free of the mold, it often happens that certain of the ice pieces are thawed free of the mold while others remain frozen to the mold; some of the ice pieces may be more tenacious than others. When this happens, the force that was intended to be divided more or less uniformly between a number of ice pieces, may be concentrated on a single piece, with the result that when this single piece finally lets go, instead of being slowly removed from the mold as intended, the ice piece is thrown from the mold by the force applying mechanism. In other words, the ice pieces may not always be removed from the mold in a manner that they come to rest in a drying zone before being discharged to storage.

It is an object of this invention to provide a method of and means for removing ice pieces from a mold in an orderly manner.

It is a further object of this invention to apply an opposing force to a plurality of moving ice pieces while applying an ejecting force to such ice pieces.

Briefly, in accordance with this invention, I provide a knife-edge in an ice-forming surface of an ice mold in a manner that as the ice is ejected from the mold the knife-edge or other such element cuts into the ice as it is moved from the mold. With this arrangement the ejecting force is distributed uniformly between the several ice pieces even though one or more of such ice pieces may adhere to the mold after other ice pieces have been thawed free thereof. The ice batch is removed from the mold as a unit and is held on the top of the ejector blades for drying of the wet surfaces thereof while a new batch of ice is being frozen in the mold. When the ejector again starts rotating at the next transfer cycle, the ice on top of the blades is dry and is first thrown off over the left side of the mold. The projections on the mold partitions guide the ice as it leaves the ejector so that it does not tumble end over end into the storage receptacle. The ice pieces fall into the storage receptacle where they are stored with previous batches.

The invention together with its objects and advantages is set forth in more technical detail in the following description and accompanying drawings wherein:

Fig. 1 is a perspective of the principal components of my improved ice maker;

Fig. 2 is a transverse section through the ice mold and showing the ejector mechanism rotating an ice piece out of the mold;

Fig. 3 is a perspective of the knife-edge element;

Fig. 4 is a top plan of a portion of the ice mold shown in Fig. 2, with the ejector mechanism omitted;

Fig. 5 is a partial sectional view similar to Fig. 2 and showing a modified form of knife-edge;

Fig. 6 is a partial top plan of the ice mold and knife-edge shown in Fig. 5;

Fig. 7 is a top plan similar to Fig. 4 and showing the modified knife-edges of Figs. 5 and 6; and Fig. 8 is a wiring diagram of the controls for the ice maker.

*General description*

As shown in Figs. 1 and 2, I have incorporated my ice maker in a household refrigerator 10 having a freezing compartment 11 in the upper portion thereof. Only so much of the refrigerator as is necessary for a complete understanding of this invention is shown in the drawing. The ice maker includes a mold 12 securely mounted on a freezing shelf 13 within the freezing compartment 11 of the refrigerator. A refrigerating coil 14, connected to a suitable refrigerating system, not shown, is placed in good thermal contact with the freezing shelf 13. An ejector mechanism 15 is mounted above the ice mold and includes a shaft 16 which projects beyond the rear of the ice mold. The shaft 16 is connected by a universal coupling 17 to a second shaft 18 which forms a part of a ratchet and pulley mechanism 19, mounted on the rear wall 20 of the refrigerator. An ice receiver or storage receptacle 21 is located in the freezing compartment below the ice mold.

The ratchet and pulley mechanism 19 is the same as that disclosed in the above patent application of Sven W. E. Andersson and includes a free wheeling pulley 24 mounted for rotation on the shaft 18 and a ratchet wheel 25 securely fixed to the shaft 18. The arrangement is such that when the free wheeling pulley 24 is rotated in a counter-clockwise direction, as viewed in Fig. 1, it rotates the ratchet wheel 25 and attached shaft 18; whereas, when the free wheeling pulley is rotated in a clockwise direction the ratchet wheel 25 and shaft 18 stand still. A power or operating mechanism for the ejector shaft 16 is mounted on the rear wall of the refrigerator and includes a hydraulic cylinder 26 having a piston 27 and a piston rod 28. The upper head of the cylinder is provided with a water connection 30 that is connected to a three-way solenoid valve 32. The solenoid valve is provided with an inlet 33 connected to a water line 34 and an outlet 35 connected to a water line 36, which latter water line leads to the ice mold 12.

A force limiter 38 includes a cylinder 40 having the lower end thereof connected to the piston rod 28 of the hydraulic cylinder 26. The cylinder 40 is closed at both ends and has a piston 42 therein connected to a piston rod 44. A compression spring 46 is located within the cylinder 40 between the piston 42 and the upper head of the cylinder. A flexible cable 48 is attached to the upper end of the piston rod 44 and wrapped around the free wheeling pulley 24 about 1½ turns, and is connected at its opposite end to a return spring 50, which return spring is anchored at its lower end to a bracket 52 secured to the rear of the refrigerator. The hydraulic cylinder 26 is secured to the rear of the refrigerator by upper and lower brackets 53 and 54, respectively.

Ice mold

The ice mold or heat exchange element 12 comprises an aluminum die casting that is adapted to rest upon and be secured to the freezing shelf 13. The interior of the mold is divided by integral partitions 60 into several compartments each having a generally arcuate contour like a segment of a cylinder. The partitions 60 are tapered from the left to the right side of the mold and are each provided with an upstanding projection 61 at the left side thereof. The ice mold is provided with an upwardly projecting edge 62 on its right side. So that water may flow from one compartment to another when filling the mold, the partitions 60 are each provided with a slot or weir 63, as best shown in Fig. 2. The particular shape of the slots 63 is designed to allow the ice to be easily swept out of the mold compartments. Also, these slots provide means for connecting the individual ice pieces into a unit, as will be described below. The inside of the end walls of the mold slant outwardly from left to right.

As shown, particularly in Figs. 4 and 7, the ice mold compartments are larger on the right side of the mold than the left side thereof. With this arrangement the ice pieces, once they have been freed from the partitions and mold surfaces, are readily turned in the mold. As will be described below, the ice is guided from the mold by the upwardly projecting edge 62, and the ice comes to rest on top of the ejector mechanism where it is dried. Later, the ice is guided into the ice receptacle 21 by the upstanding projections 61 on the mold partitions. The ice mold is provided with an electric heating element 64 located in holes along the bottom longitudinal edges thereof. Another hole or well is provided at the right hand side of the mold for the reception of a sensing bulb 65 of a thermostat 66, which thermostat is set to close its contacts at about 12° F. During a freezing cycle the temperature of the mold at the location of the thermostat bulb remains around 32° F., but the temperature drops promptly when the freezing is completed. The closing of the contacts of the thermostat is utilized for starting an ice ejecting cycle.

In accordance with this invention, the ice mold is provided with a plurality of knife-edge elements 70 located centrally of each mold compartment at the upper right side thereof as viewed in Fig. 2. Each of these knife-edge elements includes a set screw 72 that is threaded into an opening in the side of the mold and has a knife-edge 74 formed on the inner face thereof. The arrangement is such that as the ejector blades 82 rotate the ice pieces relative to the mold the knife-edges 74 cut into the ice and retard movement of the ejector blades. The degree to which the set screws 72 are threaded into the mold determines the amount that the knife-edges cut into and retard movement of the ice out of the mold.

Figs. 5, 6 and 7 disclose a modified knife-edge 74' that forms an integral part of the mold. That is, these knife-edges are cast into the mold. The knife-edges 74' operate in the same manner as the knife-edges 74, except that in the modified form no provision is made for adjusting the cut made in the ice pieces.

Ejector mechanism

The ejector mechanism 15 includes the shaft 16 mounted for counter-clockwise rotation at its front and rear ends in mounting plates 79 and 80, which mounting plates attached to the front and rear of the mold, respectively. The shaft 16 has a flat portion 81 on the upper part thereof and is provided with a plurality of blades 82, one for each ice mold compartment, at one side thereof. As shown, the ejector shaft is mounted off center relative to the longitudinal axis of the mold, and the blades 82 are at an angle to the flat portion 81 of the shaft.

Control mechanism

In the control mechanism, as shown in Figs. 1 and 8, there are provided several resilient feelers 84 located in the path of ice pieces discharged from the ejector blades 82 into the storage receptacle 21. These feelers are each provided in its outer end with a conventional mercury switch 85 that is closed when the feeler is in a horizontal position. One or more of the feelers may be deflected downward by ice falling into the storage receptacle, but they normally straighten out again to a more or less horizontal position when the ice has fallen clear. However, as the receptacle 21 becomes filled with ice, additional ice discharged thereinto will not be able to fall clear of the feelers, and one or more of them will be kept deflected downward, so that one or more of the switches 85 will be held open. When this occurs, as described below, no more ice will be discharged into the receptacle until some ice has been removed therefrom. The stop switches 85 are connected in series with the mold thermostat 66 and with the solenoid valve 32. A cam-actuated micro switch 86, shown only in Fig. 8, but actuated by the ratchet wheel 25, provides a bypass or parallel circuit around the thermostat switch 66 and the stop switches 85. The conductors for the heating element 64, the mold thermostat 66, the micro switch 86, the solenoid valve 32 and the stop switches 85 are brought together in an electric junction box, not shown, and they are connected between a pair of supply wires $L^1$ and $L^2$ in the manner shown in Fig. 8.

Referring now to the wiring diagram in Fig. 8, when the mold thermostat 66 closes after an ice batch has been frozen in the mold, a circuit is established between the supply wires $L^1$ and $L^2$ through this thermostat, through the normally closed stop switches 85 and through the solenoid valve 32, which valve then opens and initiates an ice ejecting cycle. Shortly after the ice ejecting operation has been started, the cam actuated switch 86 closes its double contacts whereby parallel circuits are established and the heating element 64 is connected between the supply wires $L^1$ and $L^2$. When an ice batch slides from the top of the ejector blades 82 and falls down into the receptacle 21, one or more of the resilient feelers 84 is deflected downward and thereby temporarily opens one or more of the stop switches 85. This, however, does not interrupt movement of the ejector mechanism, because the solenoid valve 32 remains energized due to the parallel circuit formed by the earlier closing of the switch 86. The ice ejecting procedure continues for the same reason even though the thermostat 66 opens due to the heat applied to the mold by the heating element 64. The switch 86 opens, however, when the ejecting operation has been completed which deenergizes both the solenoid valve 32 and the heating element 64. The return movement of the pulley 24 and the filling of the ice mold then begins to complete an ice making cycle. In case the ice delivered to the receptacle 21 should hold one or more of the stop switches 85 open, due to the receptacle being filled with ice pieces, the transfer procedure is still completed so that a new batch of ice can be frozen in the mold, but it stays there, because now the closing of the thermostat 66 will not complete a circuit through the solenoid valve 32.

*Operation*

Assume that a batch of ice has been frozen in the mold, in other words, the temperature of the mold has been reduced to the point that the thermostat 66 closes the circuit to the solenoid valve 32. Energization of the solenoid valve 32 causes the inlet 33 to open and the exhaust 35 to close. With the valve in this position, water under pressure is supplied from the water line 34, through the inlet 33, through the valve 32 and the connector 30 to the hydraulic cylinder 26. This water entering the cylinder 26 forces the piston 27 and the piston rod 28 downward. Downward movement of the piston rod 27 causes counter-clockwise rotation (as viewed in Fig. 1) of the freewheeling pulley 24 through the torque reducing mechanism 38 and the flexible cable 48. Rotation of the freewheeling pulley causes rotation of the ratchet wheel 25, the shaft 18 and the ejector shaft 16. As the ratchet wheel 25 rotates, the cam actuated switch 86 is closed which establishes parallel circuits through the heater 64 and through the solenoid valve 32. Thus, the heating element 64 is energized whereby heat is applied to the ice mold.

When the shaft 16 has rotated about 180° from the starting point the ejector blades 82 will have contacted the ice in the mold. However, the ice is still frozen to the mold and this temporarily prevents the ejector mechanism from completing an ice transfer cycle pending the thawing of the ice bond by heat liberated by the heating elements 64. The torque reducing mechanism 38 will, however, allow the piston 27 in the hydraulic cylinder 26 to complete its downward movement in one continuous operation and thus avoid a stalling of the hydraulic piston when the ejector is stopped by the ice frozen to the mold. With this arrangement the ejector shaft 16 is not subjected to excessive torque due to high water pressure. The torque applied to the conveyor shaft 16 is independent of water pressure in the hydraulic cylinder. This torque is determined solely by the difference in strength between the springs 46 and 50 and may consequently be limited to a suitable value.

As the piston 27 descends in the hydraulic cylinder 26 it draws the cylinder 40 downward relative to the piston 42 thereby compressing the spring 46 between the piston 42 and the top closure member of the cylinder 40. The spring 46 is made stronger than the return spring 50, so that when sufficient heat has been applied to the ice mold to free the ice therefrom, the compression spring 46 expands, thereby lowering the piston 42 and the piston rod 44. The freewheeling pulley 24, through the cable 48, completes a counter-clockwise revolution (as viewed in Fig. 1) and in so doing rotates the ejector shaft 16 and the attached blades 82 which turn the ice out of the mold and bring it to rest on top of the blades. However, this latter movement is retarded by the knife-edges 74 or 74' which cut into the ice as it is swept out of the mold. Due to the braking action obtained from the knife-edges 74 or 74', the turning of the pulley 24 takes place at a moderate speed and the rotated ice pieces come to rest on top of the ejector blades. Otherwise, some of the ice pieces may stick to the mold, and when they are finally loosened they may be thrown off into the bin 21 before the wetted surface thereof has had a chance to be dried.

The cable 48 will continue to rotate the freewheeling pulley 24 in a counter-clockwise direction until the cam actuated switch 86 opens and deenergizes the solenoid valve 32 to close the water inlet 33 and open the exhaust 35. This completes the ice ejecting cycle. The return spring 50, through the cable 48, now reverses the motion of the freewheeling pulley 24 at which time the ejector shaft 16 remains stationary. In reversing the motion of the freewheeling pulley 24 the piston 27 of the hydraulic cylinder 26 is moved upward, discharging the water therein through the connector 30, the valve 32, the exhaust 35, the tube 36 and the trough 37 into the ice mold 12. The hydraulic cylinder 26, in other words, not only furnishes the required power for driving the ejector mechanism but it also measures the water for proper filling of the ice mold.

An ice batch is held on the top of the ejector blades for drying of the wet surfaces thereof while a new batch of ice is being frozen in the mold. When the ejector again starts rotating at the next transfer cycle, the ice on top of the blades is dry and is first thrown off over the left side of the mold. The projections 61 on the mold partitions guide the ice as it leaves the ejector so that it does not tumble end over end into the storage receptacle 21. The ice pieces fall into the storage receptacle where they are stored with previous batches. When the receptacle 21 becomes filled with ice one or more of the mercury switches 85 will be held open and no more ice will be discharged thereinto until some ice has been removed therefrom.

Without further description it is thought that the features and advantages of the invention will be readily apparent to those skilled in the art to which this invention appertains, and it will, of course, be understood that changes in form, proportions and minor details of construction may be resorted to without departing from the spirit of the invention and scope of the claims.

What is claimed is:

1. An ice mold having an ice forming compartment therein, means for forming an ice piece in said compartment, means for moving said ice piece relative to said compartment, and an ice-cutting knife-edge associated with said compartment in a manner as to cut into a surface of the ice piece as the piece is moved relative to the compartment to thereby retard relative movement between said compartment and said ice piece.

2. An ice maker comprising a mold, means dividing said mold into a plurality of ice forming compartments, means for forming a plurality of ice pieces in said compartments and mechanism for simultaneously removing the plurality of ice pieces from said compartments, said mechanism including a plurality of members movable into contact with said plurality of ice pieces for urging said ice pieces from said compartments, and a raised surface formed in a wall of each of said compartments for opposing movement of said ice pieces from said compartments whereby a substantially uniform force is continuously applied by said plurality of members to each of said ice pieces as they are removed from said compartments.

3. An ice maker comprising a mold having an ice forming compartment therein, means forming an ice piece in said compartment, and mechanism for removing the ice piece from the compartment, said mechanism including means in the mold for thawing the ice piece free of the compartment, a movable member for contacting and urging the ice piece from the compartment simultaneously with the operation of the thawing means whereby the ice piece is removed from the compartment coincident with the thawing thereof, and a raised surface formed in a wall of said mold for continuously contacting and retarding movement of the ice piece from the compartment.

4. An ice maker comprising a mold having an ice forming compartment therein, means for forming an ice piece in said compartment, and mechanism for removing the ice piece from the compartment, said mechanism including a heating element in the mold for breaking the bond between the ice piece and the compartment, a rotatable member for contacting and moving the ice piece relative to the compartment, said rotatable member being so constructed and arranged as to stall while energized upon contact with the ice frozen in the compartment and to automatically move the ice immediate the bond between the ice and the compartment is broken, and a raised surface formed on a wall of said compartment for contacting said ice piece and acting in opposition to said movable member for retarding movement of the ice from the compartment.

5. An ice maker comprising an ice mold having a generally arcuate contour, a freezer for congealing water in the mold, power mechanism operative to cause relative turning movement between the mold and an ice piece formed therein to remove the ice piece from the mold, a control device operative responsive to the formation of the ice piece to instigate operation of the power mechanism, and means operative responsive to the relative turning movement between the mold and ice piece for retarding such movement.

6. An ice maker comprising a mold having a generally arcuate contour, a freezer for congealing water in the mold, means in the mold for thawing an ice piece free thereof, a conveyor having a rotatable member movable through the mold for engaging and removing the ice piece from the mold, means operative responsive to the formation of the ice piece to instigate operation of the thawing means and the conveyor, and means operable by movement of the ice from the mold for retarding such movement.

7. A method for automatically producing pieces of ice which includes filling a multi-compartment mold with water, freezing said water, thereby forming a plurality of ice pieces, breaking the frozen bond between the compartments and the ice pieces, applying a first force in a circular path simultaneously to the top surface of each of the ice pieces in a manner that the ice pieces are rotated and removed from the mold compartments, applying a second force to each of said ice pieces in a manner that rotation and removal of the ice pieces from the compartments is retarded, bringing the removed ice pieces to rest in an upside down position in a freezing zone above the mold, and drying the removed pieces of ice in said freezing zone.

References Cited in the file of this patent

UNITED STATES PATENTS

| | | |
|---|---|---|
| 1,907,503 | Chilton | May 9, 1933 |
| 2,077,820 | Arp | Apr. 20, 1937 |
| 2,161,321 | Smith | June 6, 1939 |
| 2,168,739 | Miner | Aug. 8, 1939 |
| 2,259,066 | Gaston | Oct. 14, 1941 |
| 2,303,935 | Hedlund | Dec. 1, 1942 |
| 2,364,559 | Storer | Dec. 5, 1944 |
| 2,431,916 | Caesar | Dec. 2, 1947 |
| 2,435,802 | Smith | Feb. 10, 1948 |
| 2,466,831 | Van Vleck | Apr. 12, 1949 |
| 2,507,835 | Storer | May 16, 1950 |
| 2,522,651 | Van Vleck | Sept. 19, 1950 |